(12) United States Patent
Hwang et al.

(10) Patent No.: US 12,731,016 B2
(45) Date of Patent: Sep. 8, 2026

(54) APPARATUS FOR IMPLEMENTING HARDWARE-BASED DROPOUT FOR ARTIFICIAL NEURAL NETWORK USING SELECTOR ELEMENT AND NEURAL NETWORK CIRCUIT SYSTEM USING THE SAME

(71) Applicant: POSTECH ACADEMY-INDUSTRY FOUNDATION, Pohang-si (KR)

(72) Inventors: Hyunsang Hwang, Pohang-si (KR); Dongmin Kim, Pohang-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 816 days.

(21) Appl. No.: 18/180,072

(22) Filed: Mar. 7, 2023

(65) Prior Publication Data

US 2023/0385621 A1 Nov. 30, 2023

(30) Foreign Application Priority Data

May 25, 2022 (KR) ........................ 10-2022-0064198

(51) Int. Cl.
*G06N 3/063* (2023.01)

(52) U.S. Cl.
CPC .................................... *G06N 3/063* (2013.01)

(58) Field of Classification Search
CPC ........ G06N 3/063; G06N 3/065; G06N 3/082; H10B 63/24; H10N 70/231; H10N 70/821
See application file for complete search history.

(56) References Cited

U.S. PATENT DOCUMENTS

2018/0174025 A1* 6/2018 Jin ......................... G06N 3/048
2019/0042160 A1 2/2019 Kumar et al.
2020/0218967 A1* 7/2020 Strachan ............... G06N 3/088
(Continued)

FOREIGN PATENT DOCUMENTS

KR 20180070194 A 6/2018
KR 102134339 B1 7/2020
(Continued)

OTHER PUBLICATIONS

S. Dutta et al. "Neural sampling machine with stochastic synapse allows brain-like learning and inference", Nature Communications, 13:2571 (2022), pp. 1-10.

*Primary Examiner* — Daniel D Chang
(74) *Attorney, Agent, or Firm* — Morgan, Lewis & Bockius LLP

(57) ABSTRACT

Disclosed are an apparatus for implementing hardware-based dropout for an artificial neural network using a selector element and a neural network circuit system using the same, and an apparatus for implementing hardware-based dropout for an artificial neural network using a selector element according to an exemplary embodiment of the present disclosure may include: a switch unit disposed on the bit line of a hardware-based artificial neural network, and provided to allow a target current which flows to the bit line to selectively flow to a predetermined neuron or ground node constituting the artificial neural network; and a driving unit which includes a selector element turned on or off according to a size relationship of an applied driving voltage and a threshold voltage, and controlling the switch unit.

14 Claims, 23 Drawing Sheets

(56) References Cited

U.S. PATENT DOCUMENTS

2023/0206048 A1* 6/2023 Kim .................... G06N 3/049
706/33
2023/0385618 A1* 11/2023 Oh ...................... G06N 3/063

FOREIGN PATENT DOCUMENTS

KR 2020-0126971 A 11/2020
KR 20220057386 A 5/2022

* cited by examiner

[FIG. 1B]
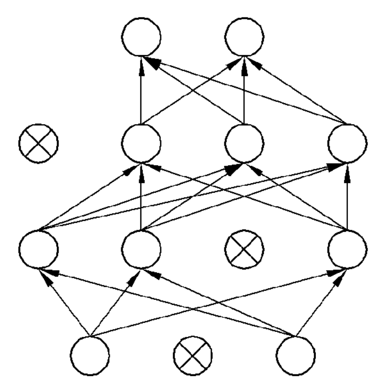
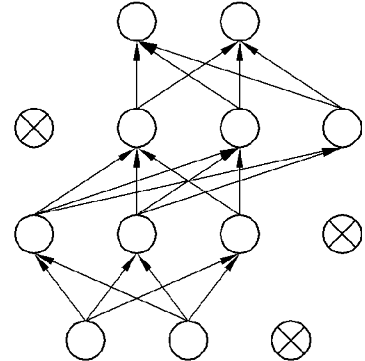
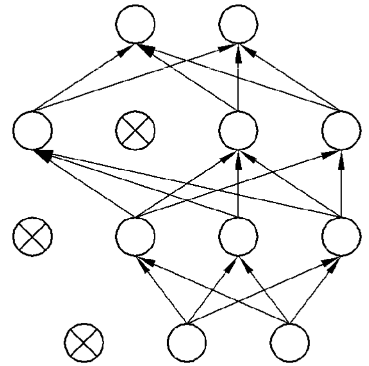
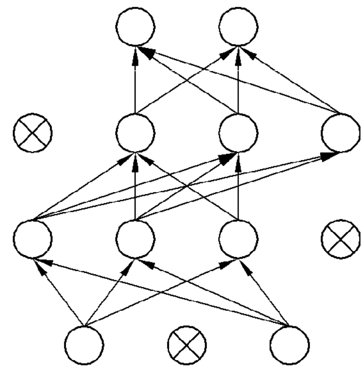

11

[FIG. 2B]
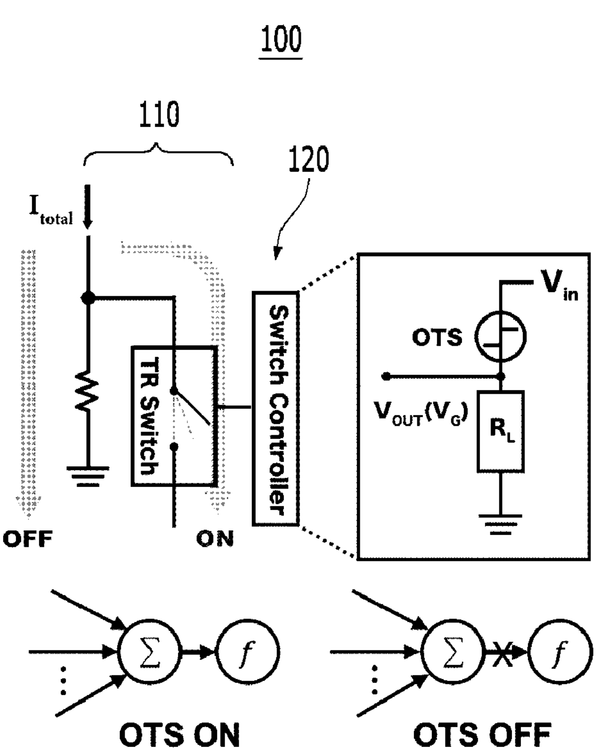

[FIG. 3A]

[FIG. 3B]
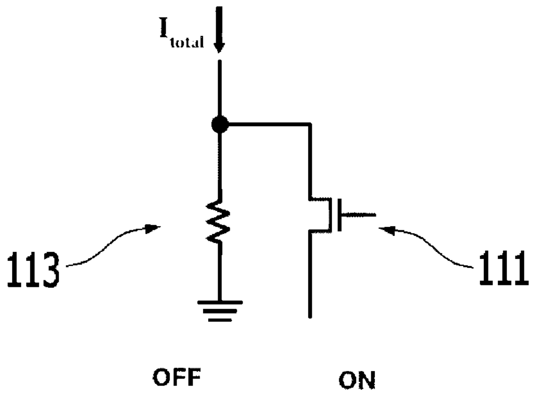

[FIG. 3C]
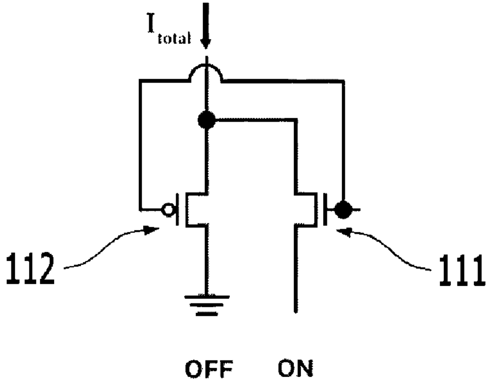

[FIG. 3D]
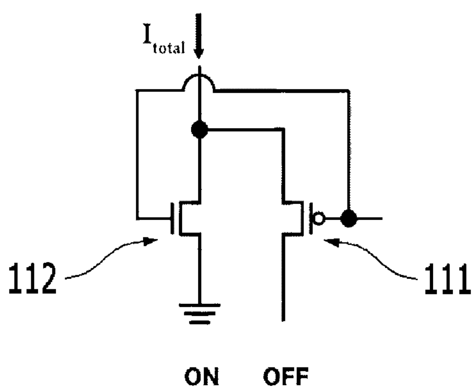

[FIG. 4A]
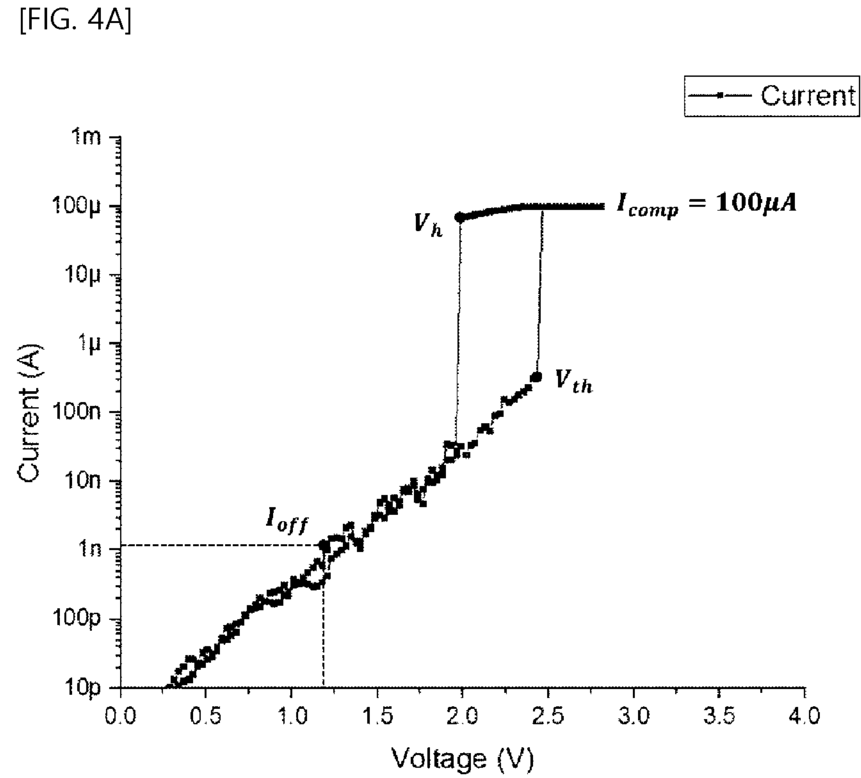

[FIG. 4B]
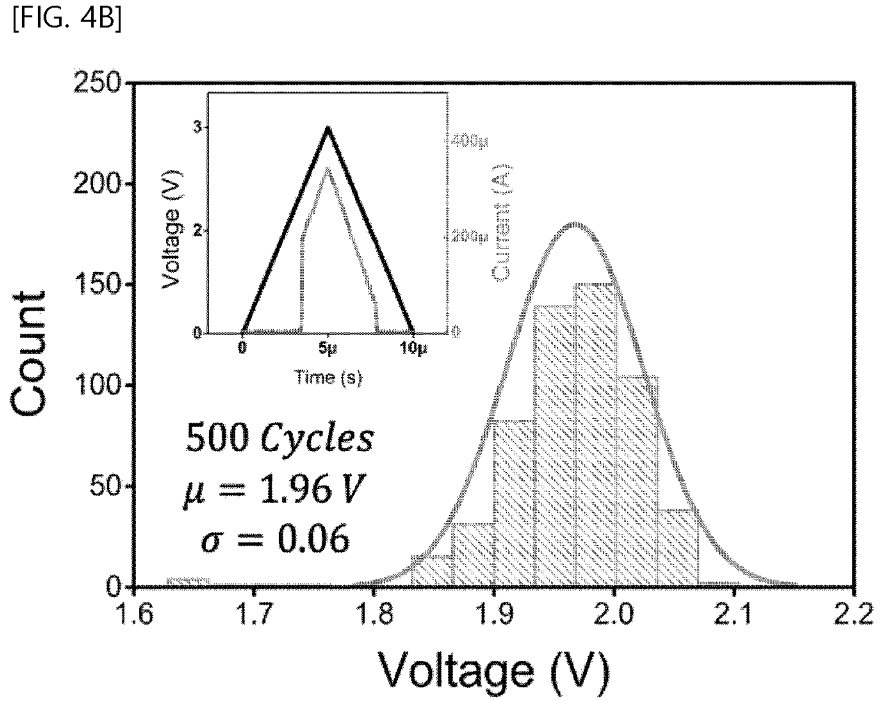

[FIG. 5]
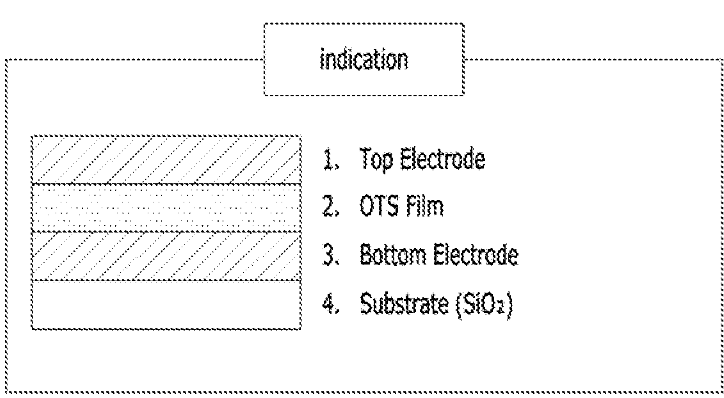
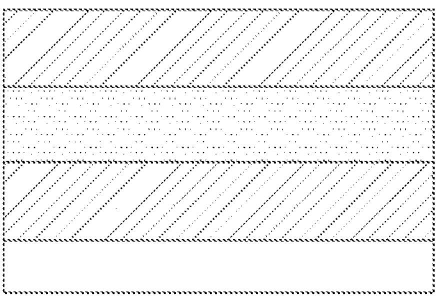

[FIG. 6]
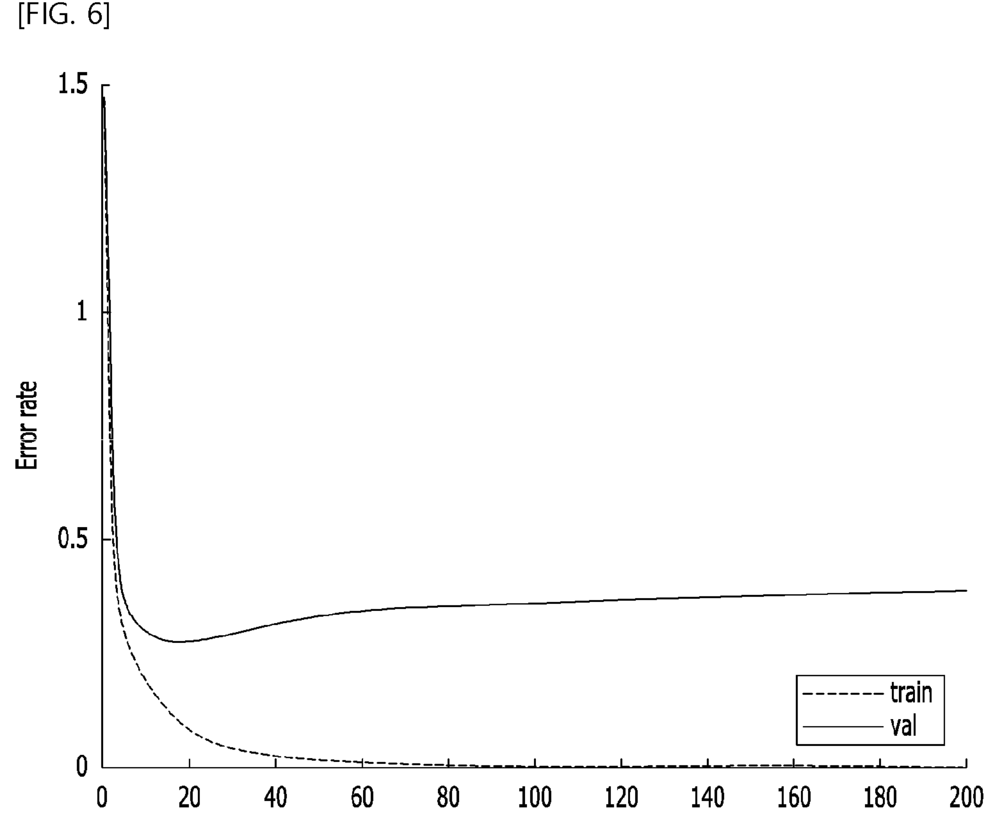

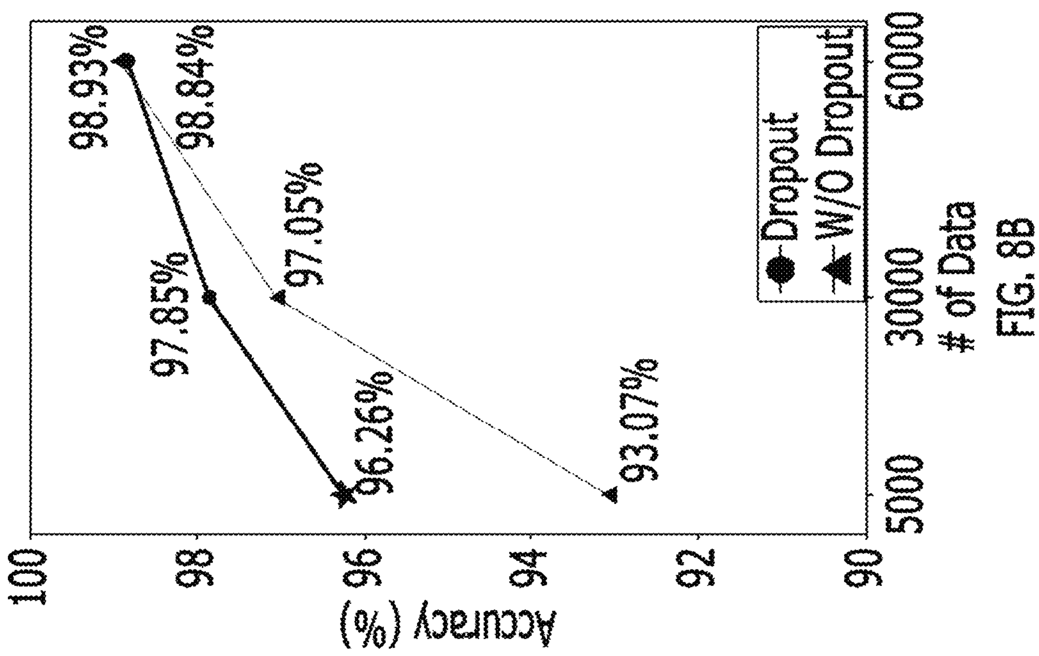
FIG. 8B
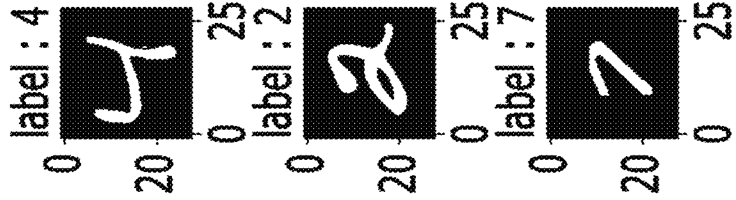
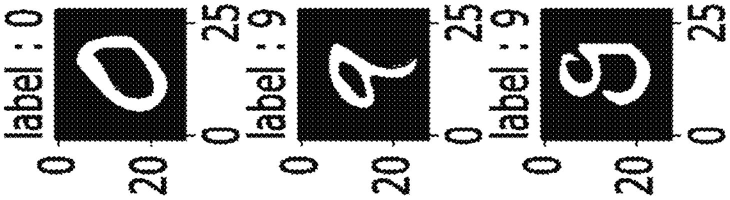
FIG. 8A

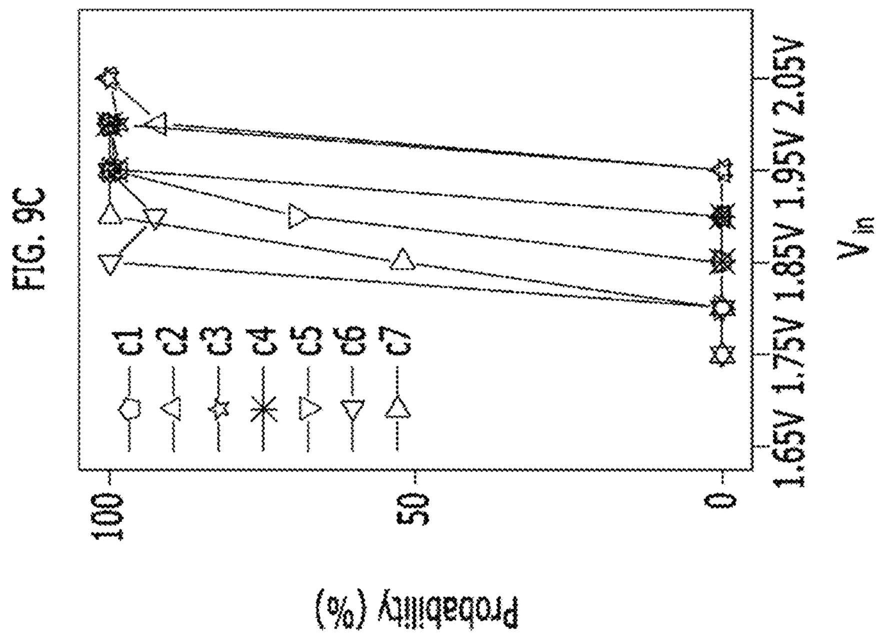
FIG. 9C
Probability (%)
100
50
0
c1
c2
c3
c4
c5
c6
c7
1.65V 1.75V 1.85V 1.95V 2.05V
$V_{in}$
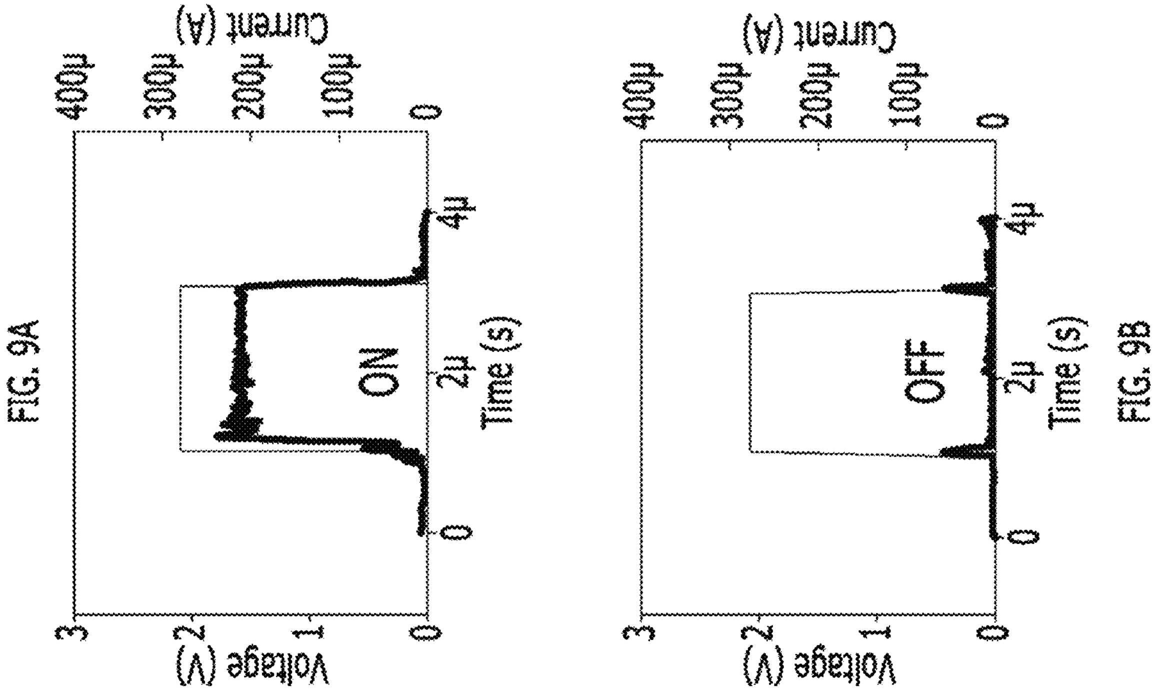
FIG. 9A
Voltage (V)
3
2
1
0
Current (A)
400μ
300μ
200μ
100μ
0
ON
0
2μ
4μ
Time (s)
Voltage (V)
3
2
1
0
Current (A)
400μ
300μ
200μ
100μ
0
OFF
0
2μ
4μ
Time (s)
FIG. 9B

[FIG. 11]
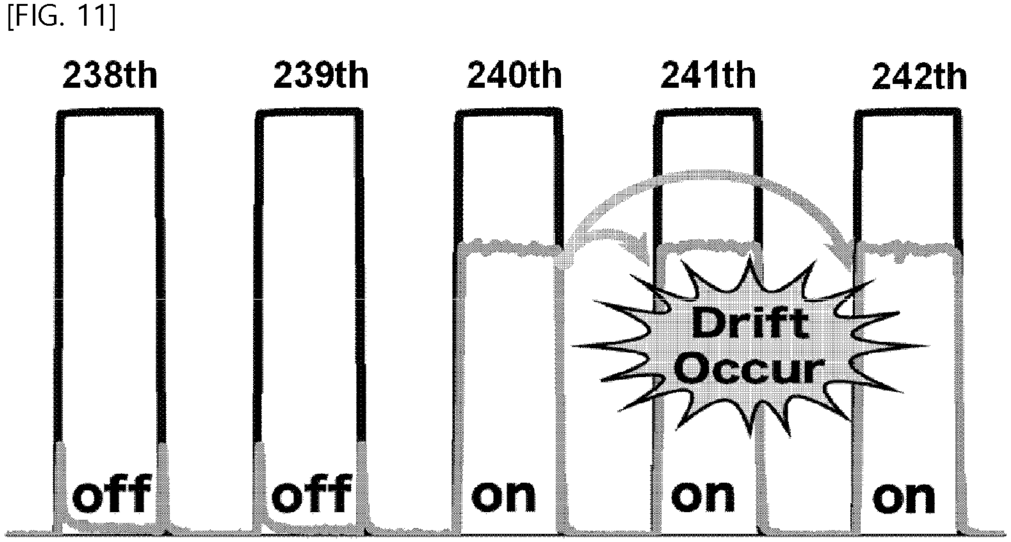

[FIG. 12]
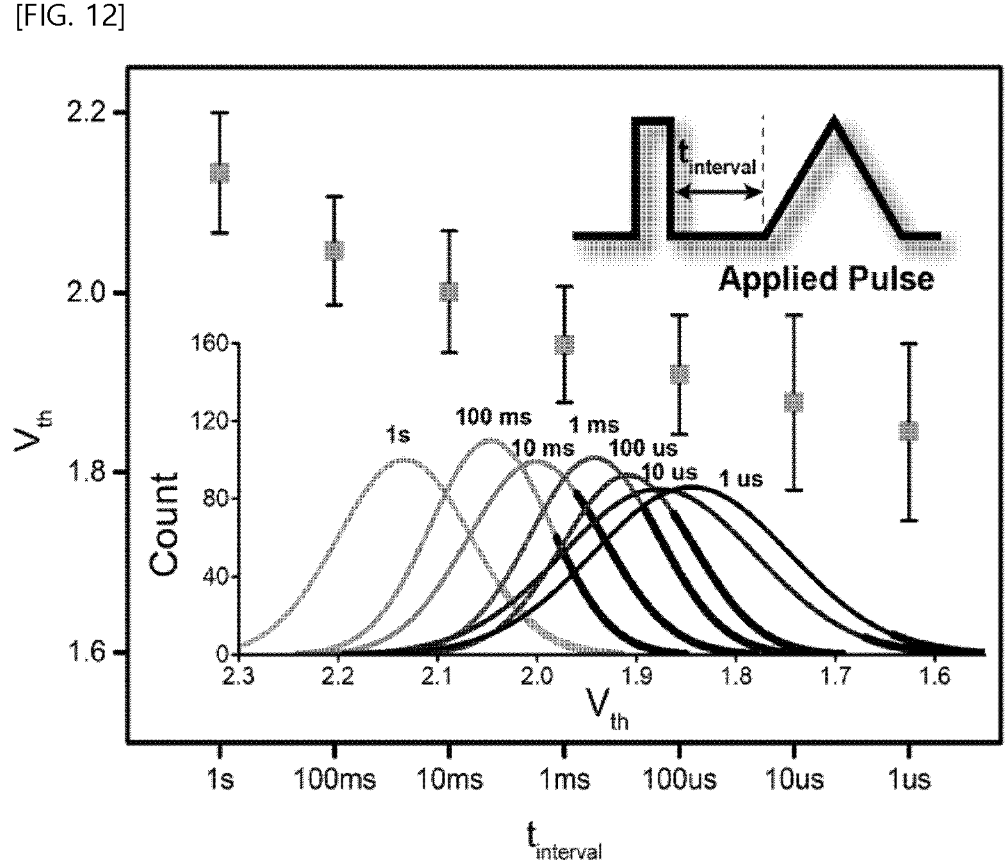

FIG. 13C
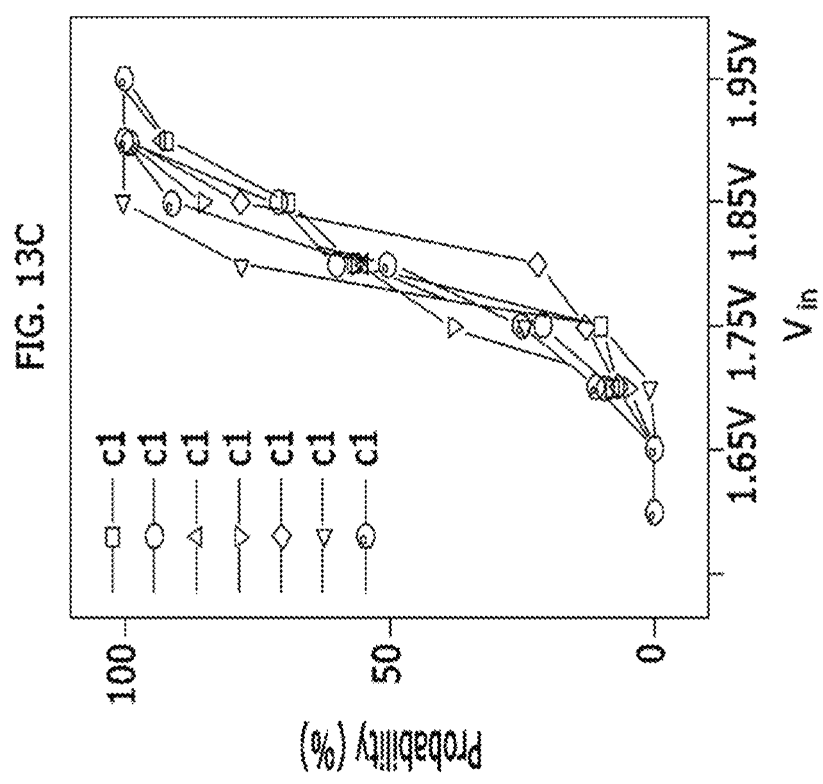
FIG. 13A
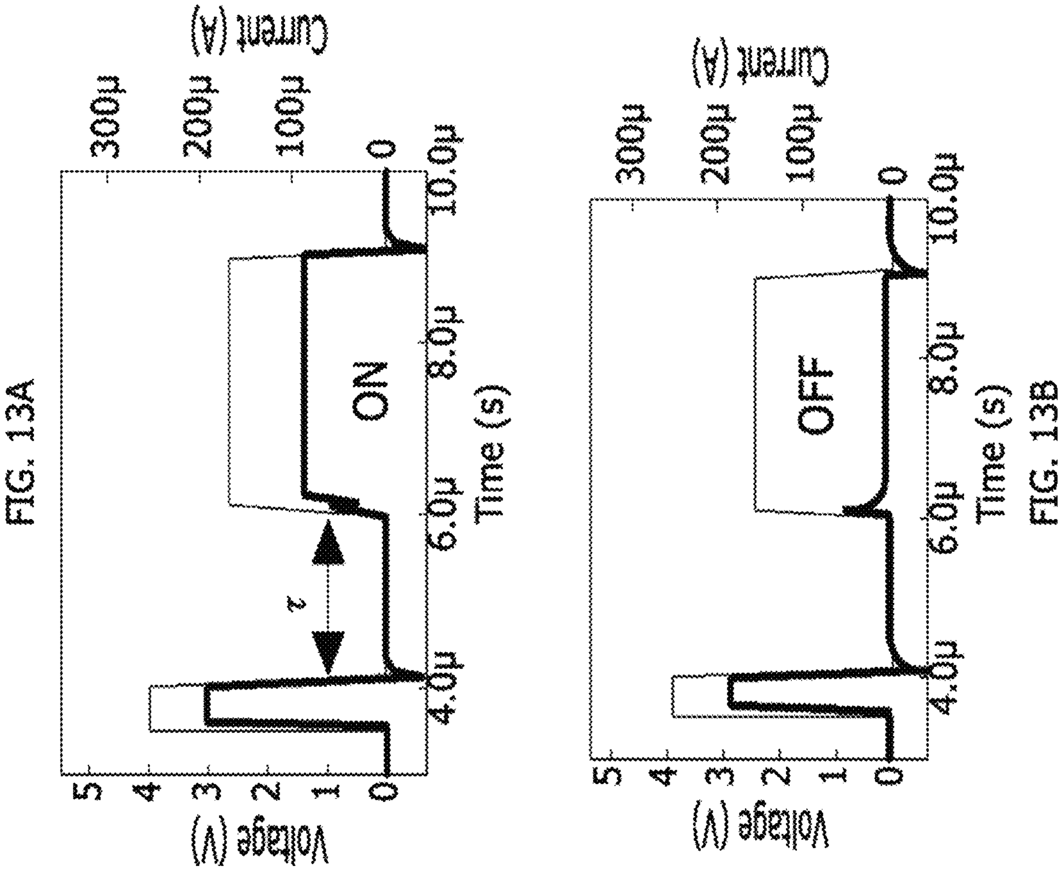
FIG. 13B

[FIG. 14]
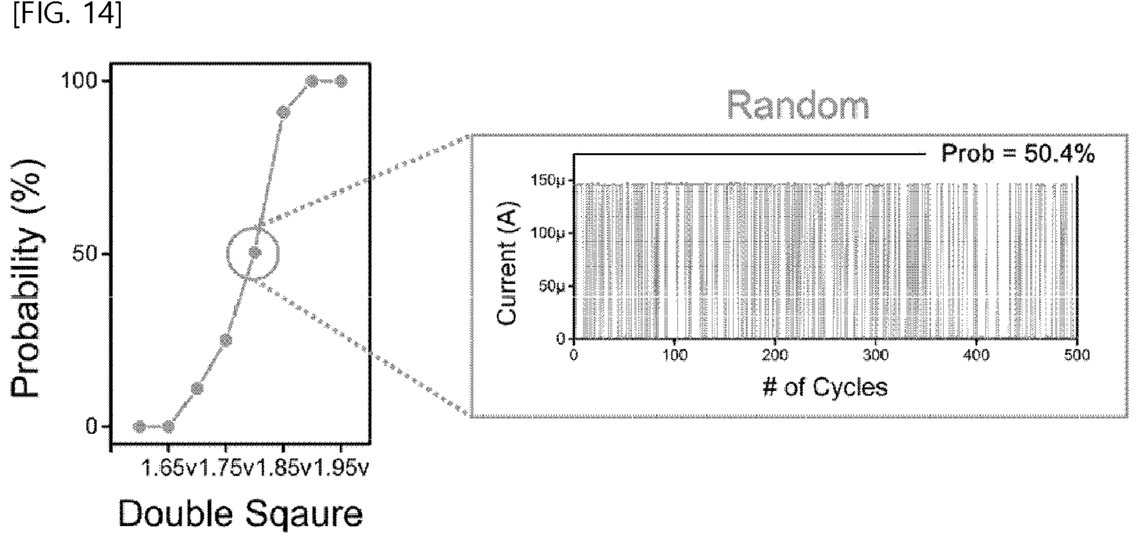

Probability (%)
100
50
0
CtoC Variation
1.65V 1.75V 1.85V 1.95V
Double Square
Voltage (V)
Time (s)
100%
80%
50.4%
Current(A)
150μ
100μ
50μ
0
0 100 200 300 400 500
#of Cycles Probability (%)
100
50
0
CtoC Variation
1.65V 1.75V 1.85V 1.95V 2.05V
Double Square
Voltage (V)
Time (s)
100%
92.4%
52.2%
Current(A)
200μ
150μ
100μ
50μ
0
OFF
ON
# of cycles
0 100 200 300 400 500
#of Cycles

[FIG. 16]
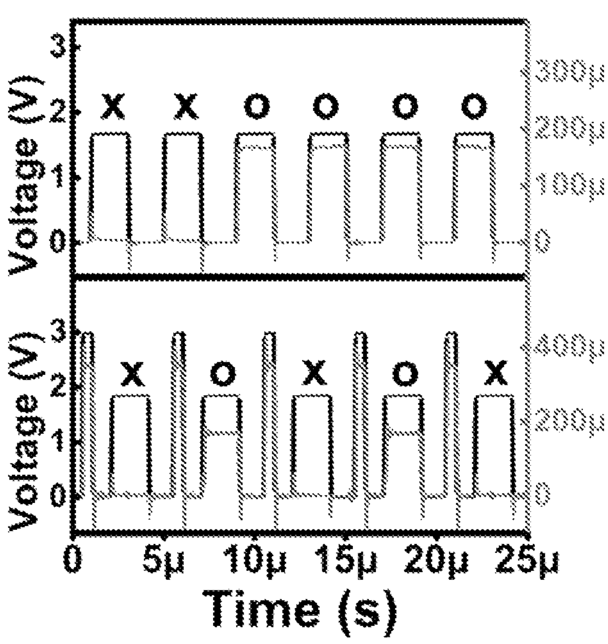

APPARATUS FOR IMPLEMENTING HARDWARE-BASED DROPOUT FOR ARTIFICIAL NEURAL NETWORK USING SELECTOR ELEMENT AND NEURAL NETWORK CIRCUIT SYSTEM USING THE SAME

CROSS-REFERENCE TO RELATED APPLICATIONS

This application claims the priority of Korean Patent Application No. 10-2022-0064198 filed on May 25, 2022, in the Korean Intellectual Property Office, the disclosure of which is incorporated herein by reference.

BACKGROUND

Field

The present disclosure relates to an apparatus for implementing hardware-based dropout for an artificial neural network using a selector element and a neural network circuit system using the same.

Description of the Related Art

An artificial neural network model as a statistical learning model developed by being inspired in a neural network of biology refers to a model in which a network formed by multiple layers and neurons constituting each layer has a problem solving ability through learning. As well known, a simple model of an artificial neural network includes an input layer, an output layer, and one or several hidden layers when all layers have multiple neurons, and each connection information between the neurons is converted into a form of weight and a bias, and stored.

In recent years, a deep learning technology based on the artificial neural network attempts to learn a question or data having a complicated structure through a high-level abstraction using a plurality of hidden layers, and non-linear conversion. The deep learning technology based on a deep neural network is evaluated as a very strong machine learning technique, but uses multiple hidden layers, so the number of parameters to be learned increases, a lot of learning time is required as much. Further, the artificial neural network is excessively concentrated on input training data, which causes an overfitting problem in that a learning result loses generality.

A dropout technology that arbitrarily deactivates nodes (neurons) during a learning process is developed and used in order to solve such an overfitting problem. Dropout that deactivates the nodes changes some values of a weight matrix used in a training (learning) stage to 0. In a matrix adopting the dropout technology, multiple matrix elements are converted into 0. In this regard, FIGS. 1A(a) and 1A(b) are conceptual diagrams illustrating a comparison of a neural network not adopting the dropout and a neural network adopting the dropout.

Referring to FIG. 1A(b), a state is illustrated in which the neural network becomes thin by applying the dropout as compared with the neural network illustrated in FIG. 1A(a) in a state in which the dropout is not applied, and a conventional dropout technique may be applied to randomly select a node (unit) and temporarily remove it from a corresponding layer.

Further, FIG. 1B is a conceptual diagram illustrating a state in which the dropout is applied in the learning process of the artificial neural network for each epoch, and referring to FIG. 1B, it may be identified that multiple thin networks may be generated by applying the dropout to each epoch in the learning process.

However, in the artificial neural network described above in detail, development for a technique that implements the dropout which is a normalization technique used in order to prevent overfitting by using device-based hardware is inadequate.

A background art of the present disclosure is disclosed in Korean Patent Registration No. 10-2134339.

SUMMARY

A technical object to be achieved by an exemplary embodiment of The present disclosure is to provide an apparatus for implementing a hardware-based dropout for an artificial neural network using a selector element and a neural network circuit system using the same, which implement a dropout which is a normalization technique applied to prevent overfitting of an artificial neural network by an element based hardware scheme.

However, a technical object to be achieved by an exemplary embodiment of the present disclosure is not limited to the technical objects and there may be other technical objects.

According to an aspect of the present disclosure, there is provided is an apparatus for implementing hardware-based dropout for an artificial neural network using a selector element which may include: a switch unit disposed on the bit line of a hardware-based artificial neural network, and provided to allow a target current which flows to the bit line to selectively flow to a predetermined neuron or ground node constituting the artificial neural network; and a driving unit which includes a selector element turned on or off according to a size relationship of an applied driving voltage and a threshold voltage, and controlling the switch unit.

Further, the threshold voltage associated with the selector element may be varied.

Further, the selector element may be turned on or off at a predetermined probability to allow the target current to be selectively applied to the predetermined neuron or the ground node in response to the predetermined probability every application of the driving voltage.

Further, the switch unit may include a first transistor in which a gate terminal is connected to an output node of the selector element, any one of a drain terminal and a source terminal is connected to a node to which the target current is applied, and the other one of the drain terminal and the source terminal is connected to the ground node, and a second transistor in which the gate terminal is connected to the output node, any one of the drain terminal and the source terminal is connected to the node to which the target current is applied, and the other one of the drain terminal and the source terminal is connected to the predetermined neuron.

Further, the first transistor may be an NMOS transistor, and the second transistor may be a PMOS transistor.

Further, the driving voltage may be applied to an input node of the selector element.

Further, the driving unit may include a resistance element disposed between the selector element and the ground node, and connected to the selector element in series.

Further, when the driving voltage is smaller than the threshold voltage, the selector element may be turned off to prevent current from flowing to the resistance element.

Further, when the driving voltage is larger than the threshold voltage, the selector element may be turned on to apply a voltage larger than a threshold voltage of the first transistor to the resistance element.

Further, the driving unit may determine a magnitude of the driving voltage applied to the selector element based on statistical data associated with a variation pattern of the threshold voltage, and a predetermined dropout ratio.

Further, the dropout implementation apparatus may be disposed to correspond to each of a plurality of columns with respect to a crossbar array having a structure including a plurality of rows and the plurality of columns to correspond to a plurality of neurons constituting the artificial neural network.

Further, the selector element may be an Ovonic threshold switch selection element.

Further, the Ovonic threshold switch selection element may be provided in a hierarchical structure including a bottom tungsten electrode, an OTS film, a buffer layer, and a top tungsten electrode.

Further, the target current may correspond to a computation result of a previous neuron computed preceding the predetermined neuron among the plurality of neurons constituting the artificial neural network.

Further, when the switch unit is controlled to allow the target current to flow to the ground node in a specific epoch when learning the artificial neural network, the predetermined neuron may not be involved in learning the artificial neural network in the corresponding epoch.

Meanwhile, according to another aspect of the present disclosure, there is provided a neural network circuit system using an apparatus for implementing a hardware-based dropout for an artificial neural network using a selector element, which may include: a crossbar array having a structure including a plurality of rows and a plurality of columns to correspond to a plurality of neurons constituting an artificial neural network; and a plurality of apparatuses for implementing a hardware-based dropout for an artificial neural network using a selector element, which is disposed to correspond to the plurality of columns, respectively.

The problem solving means is just exemplary, and should not be interpreted as an intention of limiting the present disclosure. In addition to the exemplary embodiment, an additional embodiment may exist in drawings and a detailed description of the present disclosure.

According to an exemplary embodiment of the present disclosure, it is possible to provide an apparatus for implementing a hardware-based dropout for an artificial neural network using a selector element which implements a dropout which is a normalization technique applied to prevent overfitting of an artificial neural network by an element based hardware scheme, and a neural network circuit system using the same.

According to an exemplary embodiment of the present disclosure, it is possible to provide an apparatus for implementing a hardware-based dropout for an artificial neural network which is positioned on a bit line of a crossbar array and adjusts current applied to a neuron circuit to arbitrarily turn on or off a specific neuron constituting an artificial neural network to be applied to a resistance memory array based neuromorphic hardware, and a neural network circuit system using the same.

According to an exemplary embodiment of the present disclosure, it is possible to provide an apparatus for implementing a hardware-based dropout for an artificial neural network using a selector element which can apply a dropout to technologies using a large and complicated artificial neural network, such as autonomous driving, image processing, smart factory implementation, etc., from an edge computing environment to be learned with limited data, and a neural network circuit system using the same.

According to an exemplary embodiment of the present disclosure, a hardware-based dropout is implemented through a selector element and two transistors to enable an on-chip operation in which power efficiency is excellent and communication with a host computer or an external circuit is not required.

However, an effect which can be obtained in the present disclosure is not limited to the effects, and there may be other effects.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1B is a conceptual diagram illustrating a state in which the dropout is applied in a learning process of an artificial neural network for each epoch.

FIG. 2B is a schematic configuration diagram of an apparatus for implementing a hardware-based dropout for an artificial neural network using a selector element according to an exemplary embodiment of the present disclosure.

FIG. 3A is a detailed circuit diagram of a driving unit of an apparatus for implementing a hardware-based dropout for an artificial neural network using a selector element according to an exemplary embodiment of the present disclosure.

FIG. 3B is a detailed circuit diagram of a switch unit of an apparatus for implementing a hardware-based dropout for an artificial neural network using a selector element according to a first exemplary embodiment of the present disclosure.

FIG. 3C is a detailed circuit diagram of a switch unit of an apparatus for implementing a hardware-based dropout for an artificial neural network using a selector element according to a second exemplary embodiment of the present disclosure.

FIG. 3D is a detailed circuit diagram of a switch unit of an apparatus for implementing a hardware-based dropout for an artificial neural network using a selector element according to a third exemplary embodiment of the present disclosure.

FIGS. 4A to 4C(b) are diagrams for describing operation characteristics of the selector element of the apparatus for implementing a hardware-based dropout for an artificial neural network according to an exemplary embodiment of the present disclosure.

FIG. 5 is a diagram illustrating a structure of an Ovonic threshold switch selection element.

FIG. 6 is a diagram illustrating a comparison of open forms of a learning error of a neural network in which overfitting occurs and a test error.

FIGS. 8A and 8B are diagrams illustrating a comparison of a difference in performance between the neural network to which the dropout is applied and the neural network to which the dropout is not applied.

FIGS. 9A to 9C are graphs illustrating a variation between a current response and a cycle for probability characteristics of the selector element in a case of turning on the selector element and a case of turning off the selector element when a square pulse input of the same magnitude is applied to the selector element.

FIG. 11 is a diagram illustrating enlargement of the current response for the pulse at an interval in which a turn-off state of the selector element is changed to a turn-on state.

FIG. 12 is a conceptual diagram for describing the drift phenomenon.

FIGS. 13A to 13C are graphs illustrating a variation between a current response and a cycle for probability characteristics of the selector element in a case of turning on the selector element and a case of turning off the selector element when a double square pulse input is applied to the selector element.

FIG. 14 is a graph illustrating the turn-on ratio, and turn-on and off operations for individual pulses when the double square pulse is applied at multiple times.

FIG. 16 is a graph illustrating a comparison of current responses of the single square pulse and the double square pulse.

DETAILED DESCRIPTION OF THE EMBODIMENTS

Figure 1A:
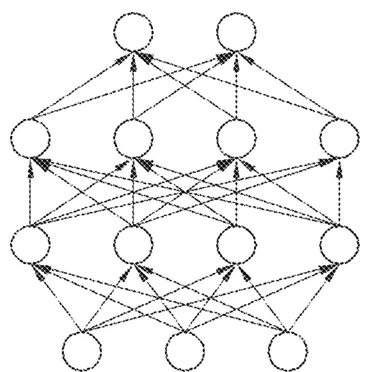
FIGS. 1A(a) and 1A(b) are conceptual diagrams illustrating a comparison of a neural network not adopting a dropout and a neural network adopting the dropout.
Figure 1A:
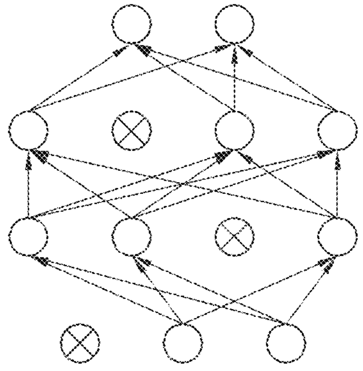

Hereinafter, exemplary embodiments of the present disclosure will be described in detail so as to be easily implemented by those skilled in the art, with reference to the accompanying drawings. However, the present disclosure may be implemented in various different forms and is not limited to exemplary embodiments described herein. In addition, in the drawings, in order to clearly describe the present disclosure, a part not related to the description is omitted and like reference numerals designate like elements throughout the specification.

Throughout the specification, when it is described that a part is "connected" with another part, it means that the certain part may be "directly connected" with another part and the parts "electrically connected" or "indirectly connected" to each other with a third element interposed therebetween as well.

Throughout the specification, it will be understood that when a member is referred to as being "on", "in upper portion", "in upper end", "below", "in lower portion", and "in lower end" another member, it can be directly on the other member or intervening members may also be present.

Throughout the specification, unless explicitly described to the contrary, a case where any part "includes" any component will be understood to imply the inclusion of stated components but not the exclusion of any other component.

The present disclosure relates to an apparatus for implementing hardware-based dropout for an artificial neural network using a selector element and a neural network circuit system using the same.

Figure 2A:
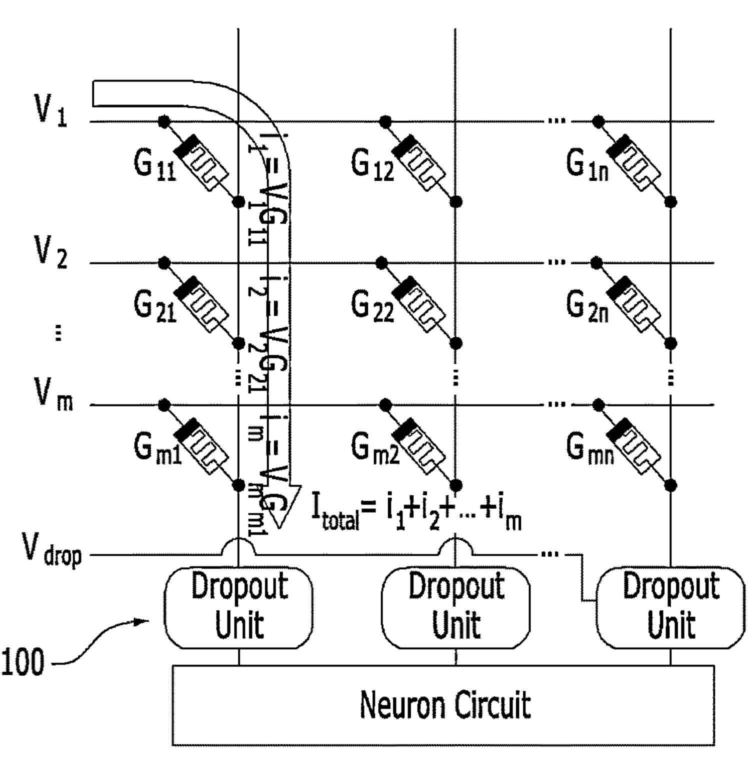
FIGS. 2A(a) and 2A(b) illustrate a schematic configuration diagram of a neural network circuit system which may adopt an apparatus for implementing a hardware-based dropout for an artificial neural network using a selector element according to an exemplary embodiment of the present disclosure.
Figure 2A:
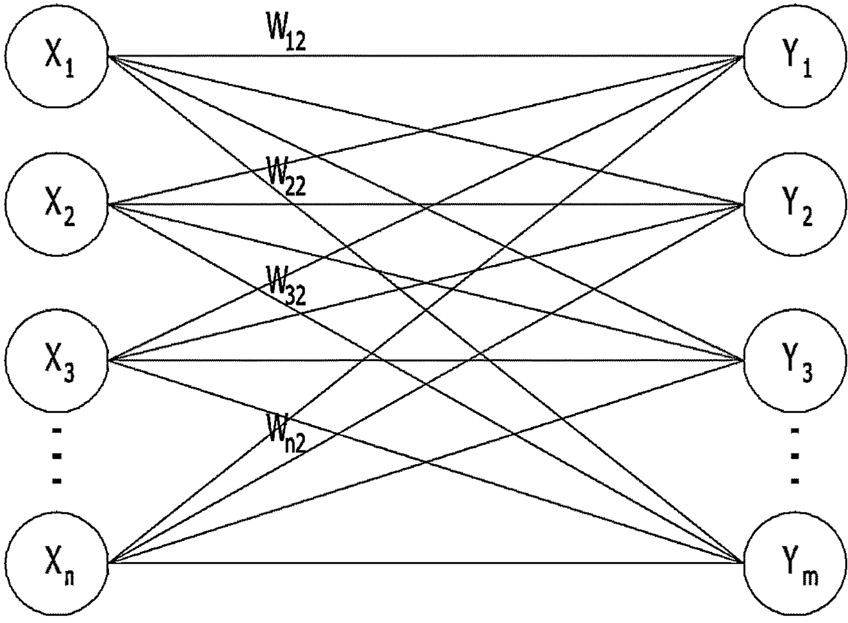

FIGS. 2A(a) and 2A(b) illustrate a schematic configuration diagram of a neural network circuit system which may adopts an apparatus for implementing a hardware-based dropout for an artificial neural network using a selector element according to an exemplary embodiment of the present disclosure.

Referring to FIGS. 2A(a) and 2A(b), the neural network circuit system according to an exemplary embodiment of the present disclosure may include a crossbar array 11 and an apparatus 100 (hereinafter, referred to as 'dropout implementation apparatus 100') for implementing a hardware-based dropout for an artificial neural network using a selector element according to an exemplary embodiment of the present disclosure. Further, referring to FIGS. 2A(a) and 2A(b), the neural network circuit system according to an exemplary embodiment of the present disclosure may include a plurality of dropout implementation apparatuses 100 disposed to correspond to a plurality of columns of the crossbar array, respectively.

More specifically, the crossbar array 11 of the neural network circuit system disclosed in the present disclosure may be provided in a structure including a plurality of rows (m rows of FIGS. 2A(a) and 2A(b)) and a plurality of columns (n columns of FIGS. 2A(a) and 2A(b)) to correspond to a plurality of neurons constituting the artificial neural network, and the dropout implementation apparatuses 100 may be disposed on bit lines of the hardware-based artificial neural network having the structure of the crossbar array 11. Further, the respective dropout implementation apparatuses 100 may allow target currents ($I_1$ to $I_m$ of FIGS. 2A(a) and 2A(b)) which flow on the bit lines to selectively a predetermined neuron or a ground node constituting the corresponding artificial neural network.

In other words, the dropout implementation apparatus 100 disclosed in the present disclosure is positioned in each bit line of the crossbar array 11 and adjusts a current (target current) which enters the neuron circuit to perform an operation of randomly turning on or off the neuron constituting the artificial neural network. That is, the dropout implementation apparatus 100 is disposed on the bit line corresponding to each neuron constituting the artificial neural network in the crossbar array 11 to implement the dropout by a scheme of forming the node between the crossbar array 11 and a next neuron circuit of the corresponding neuron, and allowing the current to selectively flow to the formed node, and as described below in detail, the dropout implementation apparatus 100 may operate to adjust a path (crossroad) associated with the formed node based on a CMOS inverter operating scheme.

Further, referring to FIG. 2A(b), each weight included in the artificial neural network corresponds to each conductance (G) value of a synapse element included in the crossbar array 11 of FIG. 2A(a), and when input voltages $V_1$ to $V_m$ are applied to the crossbar array 11, the input voltage is converted into the current according to the Ohm's law, and currents of the same column are combined by the Kirchhoff's law and applied as an input a post-neuron element. In this regard, the dropout implementation apparatus 100 disclosed in the present disclosure is disposed with respect to each column constituting the crossbar array 11 and allows the currents combined in the corresponding column to selectively flow to a ground node, so an input of the post-neuron element becomes 0 to turn off a post neuron, and as a result, the dropout implementation apparatus 100 may be omitted with respect to the corresponding epoch in the learning process of the artificial neural network.

That is, each weight included in the artificial neural network included in FIG. 2A(b) corresponds to each conductance (G) value of a synapse element included in the crossbar array 11 of FIG. 2A(a), and when input voltages $V_1$ to $V_m$ are applied to the crossbar array 11, a dropout implementation apparatus 100 in which the input voltage is converted into the current according to the Ohm's law, and currents of the same column are combined by the Kirchhoff's law and applied as an input a post-neuron element may be disposed with respect to the crossbar array 11, and it may be appreciated that the dropout implementation apparatus 100 is positioned in a last part of each column in which values (currents) corresponding to an input of the post neuron are gathered in the crossbar array 11.

In summary, the dropout implementation apparatus 100 may be disposed to correspond to each of a plurality of columns with respect to the crossbar array 11 having a structure including a plurality of rows and the plurality of columns to corresponding to the plurality of neurons constituting the artificial neural network, and in this case, the target current $I_{total}$ applied to each dropout implantation apparatus 100 may correspond to a computation result of a previous neurons computed preceding to a predetermined neuron among the plurality of neurons constituting the artificial neural network.

FIG. 2B is a schematic configuration diagram of an apparatus for implementing a hardware-based dropout for an artificial neural network using a selector element according to an exemplary embodiment of the present disclosure. Specifically, FIG. 2B illustrates enlargement of a structure the dropout implementation apparatus (dropout unit) 100 illustrated in FIG. 2A(a).

Referring to FIG. 2B, the dropout implementation apparatus 100 may include a switch unit 110 and a driving unit 120. Specifically, the switch unit 110 may be disposed on the bit line of the hardware-based artificial neural network, and provided to allow the target current $I_{total}$ which flows to the bit line to selectively flow to a predetermined neuron or ground node constituting the artificial neural network.

Meanwhile, in the description of the exemplary embodiment of the present disclosure, the switch unit 110 may be differently referred to as 'switch module', and the driving unit 120 may be differently referred to as 'switch controller module.'

Further, referring to FIG. 2B, Itotal correspond to a current value (in other words, an input value of a post-neuron) which is gathered in one column of the crossbar array 11, and an operation of allowing the current to flow to the post-neuron by the driving unit 120 corresponding to a switch controller in which a selector element 121 and a resistance element 122 to be described below are connected in series, or allowing the current to flow the resistance element 122 and the ground node may be performed.

Hereinafter, a specific function and an operation of the dropout implementation apparatus 100 will be described with reference to FIGS. 3A to 5.

Figure 3A:
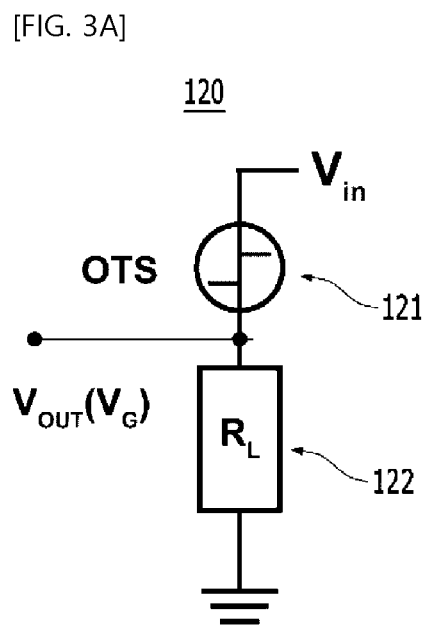

FIG. 3A is a detailed circuit diagram of a driving unit of an apparatus for implementing a hardware-based dropout for an artificial neural network using a selector element according to an exemplary embodiment of the present disclosure.

Referring to FIG. 3A, in the driving unit 120, when a driving voltage $V_{in}$ applied to the selector element 121 is larger than a threshold voltage, the selector element 121 is turned on, so the current flows to the resistance element 122 connected in series, and in this case, the voltage is applied to the resistance element 122, and since the driving unit 120 is connected to the switch unit 110, a corresponding voltage $V_{OUT}$ or $V_G$ is applied to a gate of a TR switch of FIG. 2B ('ON' of FIG. 2B). Unlike this, when the driving voltage $V_{in}$ applied to the selector element 121 is smaller than the threshold voltage, the current does not flow to the resistance element 122 connected in series, and the voltage is not applied to the resistance element 122, so 0 V is applied to the gate of the TR switch ('OFF' of FIG. 2B).

FIG. 3B is a detailed circuit diagram of a switch unit of an apparatus for implementing a hardware-based dropout for an artificial neural network using a selector element according to a first exemplary embodiment of the present disclosure, FIG. 3C is a detailed circuit diagram of a switch unit of an apparatus for implementing a hardware-based dropout for an artificial neural network using a selector element according to a second exemplary embodiment of the present disclosure, and FIG. 3D is a detailed circuit diagram of a switch unit of an apparatus for implementing a hardware-based dropout for an artificial neural network using a selector element according to a third exemplary embodiment of the present disclosure.

Referring to FIG. 3B, according to the first exemplary embodiment of the present disclosure, the switch unit 110 may include one NMOS transistor 111 and one switch resistance element 113. In this case, a resistance value of the switch resistance element 113 disposed with respect to the ground node may be set to an intermediate value which is meaningfully larger than an ON resistance of the TR switch described above, and meaningfully smaller than an OFF resistance.

According to the first exemplary embodiment of the present disclosure, when the voltage is applied from the driving unit 120, if a voltage equal to or more than a TR switch threshold voltage is applied as the corresponding voltage, the TR switch is turned on, and in this case, since a turn-on resistance of the TR switch is a relatively smaller value than the switch resistance element 113 connected to the ground node, so most target current $I_{total}$ flows to the TR switch. In other words, only a smaller current of an ignorable degree flows to the ground node according to a ratio of the turn-on resistance of the TR switch and the resistance of the switch resistance element 113.

On the contrary, according to the first exemplary embodiment of the present disclosure, when the voltage applied from the driving unit 120 is a voltage (in other words, a voltage close to 0 V) lower than the threshold voltage of the TR switch, a state in which the TR switch is turned off is maintained, and when an OFF resistance when the TR switch is turned off, an OFF resistance is a much larger than the resistance of the switch resistance element 113 of the ground node, so most target current $I_{total}$ flows to the ground node, and a value of 0 is input into the post-neuron.

Referring to FIGS. 3C and 3D, when the target current flows to a predetermined neuron through the switch unit 110, the target current $I_{total}$ which is the current combined in one column constituting the crossbar array 11 is applied to the post-neuron as illustrated in FIGS. 3C and 3D as a dropout switch is turned off to correspond to the computation result of the previous neuron computed preceding to the predetermined neuron described above, and on the contrary, when the dropout switch is turned on, the target current $I_{total}$ which is the current combined in one column constituting the crossbar array 11 flows toward the ground node illustrated in FIGS. 3C and 3D, so the target current $I_{total}$ may not be applied to the post-neuron.

In FIG. 3C, when the selector element 121 is turned on, the current flows to the resistance element 122, and while the voltage equal to or more than the threshold voltage of a first transistor 111 which is the NMOS transistor is applied to an output node N of the selector element 121, the first transistor 111 may be turned on, and as the first transistor 111 is turned on, the target current may flow to the ground node. In this case, when the target current flows to the ground node, a current which flows to ADC becomes 0, so the input value of the post-neuron (predetermined neuron) becomes 0, and the predetermined neuron becomes an OFF state in the corresponding epoch, and such an operation state may be defined as 'state in which the dropout switch is turned on'. Compared with this, when the selector element 121 is turned off, and the current does not flow to the resistance element 122, and the voltage equal to or less than the threshold voltage of the first transistor 111 which is the NMOS transistor is applied to the output node N of the selector element 121, the first transistor 111 may not be turned on and the second transistor 112 may be turned on, and as a result, the target current may flow to the ADC, and such an operation state may be defined as 'state in which the dropout switch is turned off'.

Similarly, in FIG. 3D, when the selector element 121 is turned on, the current may flow to the resistor, and the NMOS may be turned on while the voltage equal to or more than the threshold voltage of the NMOS is applied to the output node N of the selector element 121, and as a result, the target current may flow to the ADC, and such an operation state may be similarly defined as the 'state in which the dropout switch is turned off', and on the contrary, when the selector element 121 is turned off, the current does not flow to the resistor, and while the voltage equal to or less than the threshold voltage of the NMOS is applied to the output node N of the selector element 121, the NMOS may not be turned on, and while the PMOS is turned on, the target current may not flow to the ADC, but flow to the ground node, and when the target current flows to the ground node, the current which flows to the ADC becomes 0, so the input value of the post-neuron (predetermined neuron) becomes 0, and the predetermined neuron may become turned off in the corresponding epoch (the state in which the dropout switch is turned on).

Consequently, a situation in which the target current does not flow to the ADC, but flows to the ground node may be referred to as 'dropout switch being turned on,' and a situation in which the target current flows to the post-neuron through the ADC may be referred to as 'dropout switch being turned off.'

In other words, when the switch unit 110 is controlled to allow the target current $I_{total}$ to flow to the ground node in a specific epoch when learning the artificial neural network using the crossbar array 11, a predetermined neuron after the previous neuron may not be involved in learning the artificial neural network in the corresponding epoch.

Further, referring to FIGS. 3C and 3D, the switch unit 110 may include the first transistor 111 and the second transistor 112. Specifically, the first transistor 111 may be disposed so that the output node N and the gate terminal of the selector element 121 of the driving unit 120 are connected, any one of a drain terminal and a source terminal is connected to the node to which the target current $I_{total}$ is applied, and the other one of the drain terminal and the source terminal is connected to the ground node. Further, the second transistor 112 may be disposed so that the output node N and the gate terminal of the selector element 121 of the driving unit 120 are connected, any one of a drain terminal and a source terminal is connected to the node to which the target current is applied, and the other one of the drain terminal and the source terminal is connected to the predetermined neuron.

More specifically, when exemplified by referring FIG. 3C, according to a second exemplary embodiment of the present disclosure, the first transistor 111 is an NMOS transistor type and the second transistor 112 is a PMOS transistor type, and the drain terminal (a terminal illustrated at an upper side based on FIG. 3C) of the first transistor 111 may be connected to the node to which the target current $I_{total}$ is applied, and the source terminal (a terminal illustrated at a lower side based on FIG. 3C) may be connected to the ground node, and the source terminal (a terminal illustrated at the upper side based on FIG. 3C) of the second transistor 112 may be connected to the node to which the target current $I_{total}$ is applied, and the drain terminal (the terminal illustrated at the lower side based on FIG. 3C) is connected to the ADC, so the target current may flow to the predetermined neuron.

However, the present disclosure is not limited only thereto, referring to FIG. 3D, according to a third exemplary embodiment of the present disclosure, the first transistor 111 is the PMOS transistor type and the second transistor 112 is the NMOS transistor type, and the source terminal (a terminal illustrated at the upper side based on FIG. 3D) of the first transistor 111 may be connected to the node to which the target current $I_{total}$ is applied, and the drain terminal (a terminal illustrated at the lower side based on FIG. 3D) may be connected to the ground node, and the drain terminal (a terminal illustrated at the upper side based on FIG. 3D) of the second transistor 112 may be connected to the node to which the target current $I_{total}$ is applied, and the source terminal (the terminal illustrated at the lower side based on FIG. 3D) is connected to the ADC, so the target current may flow to the predetermined neuron.

Further, referring to FIGS. 3C and 3D, the driving unit 120 may include the selector element 121 that turned on or off according to a size relationship between the driving voltage $V_{op}$ applied to the driving unit 120 and the threshold voltage $V_{th}$ to control the switch unit 110. Further, referring to FIGS. 3C and 3D, the selector element 121 may be a 2-terminal structure element including an input node and an output node to which the driving voltage $V_{op}$ is applied.

Further, as illustrated in FIG. 3A described above, according to an exemplary embodiment of the present disclosure, the driving unit 120 may include the resistance element 122 which is disposed between the selector element 121 and the ground node, and connected to the selector element 121 in series.

In this regard, according to an exemplary embodiment of the present disclosure, when the driving voltage $V_{op}$ applied to the selector element 121 is smaller than the threshold voltage $V_{th}$, the selector element 121 is turned off and the current does not flow to the resistance element 122, and on the contrary, when the driving voltage $V_{op}$ applied to the selector element 121 is larger than the threshold voltage $V_{th}$, the selector element 121 is turned on and the current flows to the resistance element 122, so the voltage larger than the threshold voltage of the first transistor 111 may be applied to the resistance element 122.

In other words, according to an exemplary embodiment of the present disclosure, when the selector element 121 is turned off, a voltage close to 0 V is applied to the resistance element 122, and a voltage of 0 V is applied to the gates of the first transistor 111 and the second transistor 112, so the second transistor 112 which is the PMOS transistor is turned on and the first transistor 111 which is the NMOS transistor is turned off, and as a result, the target current $I_{total}$ may flow to the ADC.

On the contrary, according to an exemplary embodiment of the present disclosure, when the selector element 121 is turned on, a current by the driving voltage $V_{op}$ flows to the resistance element 122 and a voltage larger than the threshold voltage of the first transistor 111 which is the NMOS transistor is applied to the resistance element 122, so the first transistor 111 which is the NMOS transistor is turned on and the second transistor 112 which is the PMOS transistor is turned off, and as a result, the target current $I_{total}$ may flow to the ground node.

Figure 4C:
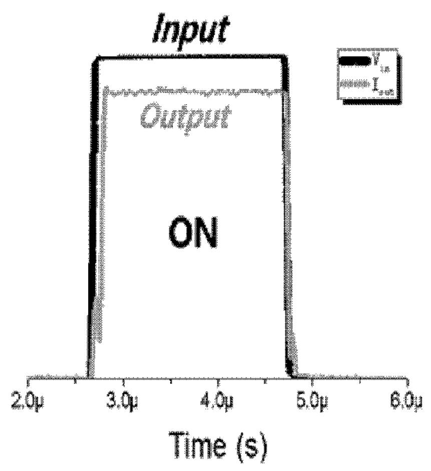
Figure 4C:
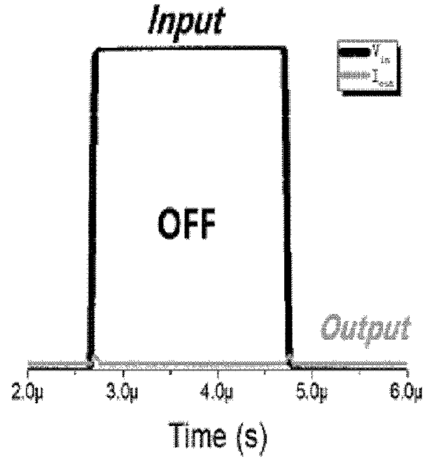

FIGS. 4A to 4C(b) are diagrams for describing operation characteristics of the selector element of the apparatus for implementing a hardware-based dropout for an artificial neural network according to an exemplary embodiment of the present disclosure.

Referring to FIGS. 4A to 4C(b), the selector element 121 shows characteristics in which the threshold voltage $V_{th}$ which is a reference for determining the turn-on or turn-off operation of the selector element 121 is not fixed, but varied, and by using such probabilistic (Stochastic or random) element characteristics, the dropout implementation apparatus 100 disclosed in the present disclosure operates to allow the target current $I_{total}$ to be selectively applied to a predetermined neuron or ground node in response to a predetermined probability every application of the driving voltage $V_{op}$ as the selector element 121 is turned on or off at a predetermined probability to implement the hardware-based dropout.

Specifically, referring to FIG. 4A, the selector element 121 disclosed in the present disclosure maintains a high-resistance turn-off state to prevent the current from flowing when applying a voltage less than the threshold voltage $V_{th}$ and is switched to a low-resistance turn-on state to allow the current to flow by applying a voltage equal to or more than the threshold voltage $V_{th}$, and has characteristics in which the selector element 121 is switched to the high-resistance turn-off state again when the input voltage is decreased to a voltage equal or less than a hold voltage $V_h$ illustrated in FIG. 4A after the selector element 121 is turned on, and in this regard, FIG. 4A is a graph illustrating a result of conducting DC sweep from 0 V to 3 V, and from 3 V to 0 V again with respect to the selector element 121, and in this case, it may be identified that a compliance current $I_{comp}$ is set to a magnitude at a level of 100 μA so as to prevent too excessive current from flowing to the selector element 121, when the selector element 121 is turned off, it may be seen that a very small current of 1.49 nA flows, and it may be identified that the threshold voltage $V_{th}$ shows a level of approximately 2.46 V.

Further, FIG. 4B is a histogram for the magnitude of the threshold voltage $V_{th}$ measured when a triangular pulse (3 V, 10 μs) is applied repeatedly over multiple times (e.g., 500 times), and referring to FIG. 4B, it may be identified that a distribution is present in the threshold voltage $V_{th}$ of the selector element 121. Further, referring to a graph illustrating inside a top left triangular pulse of FIG. 4B, a change of the current when applying the triangular pulse may be identified.

Further, FIGS. 4C(a) and 4C(b) are graphs illustrating a current response (output) when the selector element 121 is turn on and turn off in the case of inputting a square pulse. Referring to FIGS. 4C(a) and 4C(b), it may be identified through an output current that if the selector element 121 is turned on, the current flows, even when the voltage of the same magnitude is input as the square pulse, and on the contrary, if the selector element 121 is not turned on, the current does not flow.

In this regard, it may be identified that the magnitude of the driving voltage $V_{op}$ applied to the selector element 121 is adjusted to adjust a turn-on or turn-off ratio of the selector element 121.

Further, the magnitude of the driving voltage $V_{op}$ applied to the selector element 121 of the driving unit 120 may be determined based on statistical data associated with a variation pattern of the threshold voltage $V_{th}$ which is the element characteristics of the selector element 121, and a predetermined dropout ratio.

For example, when the statistical data illustrated in FIG. 4B described above is secured in advance, if the dropout implementation apparatus 100 is designed by using the selector element 121, it may be anticipated that the selector element 121 is turned on at a probability of 0% when applying a driving voltage ($V_{op}$) pulse having a magnitude of 2.1 V, it may be anticipated that the selector element 121 is turned on at a probability of 8% when applying a driving voltage ($V_{op}$) pulse of 2.2 V, it may be anticipated that the selector element 121 is turned on at a probability of 43% when applying a driving voltage ($V_{op}$) pulse of 2.4 V, it may be anticipated that the selector element 121 is turned on at a probability of 73% when applying a driving voltage ($V_{op}$) pulse of 2.5 V, and it may be anticipated that the selector element 121 is turned on at a probability of 100% when applying a driving voltage ($V_{op}$) pulse of 2.7 V.

Therefore, when the dropout ratio to be achieved by the dropout implementation apparatus 100 is determined, the selector element 121 of the dropout implementation apparatus 100 disposed to correspond to each neuron is probabilistically turned on or off by applying a driving voltage ($V_{op}$) pulse showing a turn-on probability which is close to the corresponding dropout ratio to apply the dropout to neurons according to the dropout ratio among a plurality of neurons of the corresponding layer. For example, when the predetermined dropout ratio is at a level of 50%, a pulse magnitude of the driving voltage $V_{op}$ applied to the selector element 121 may be determined as a value in a range between 2.4 V and 2.5 V.

FIG. 5 is a diagram illustrating a structure of an Ovonic threshold switch selection element.

Referring to FIG. 5, the selector element 121 may be an Ovonic threshold switch selection element type.

More specifically, referring to FIG. 5, an Ovonic threshold switch selection element type selector element 121 may be provided in a hierarchical structure including a bottom tungsten electrode, an OTS film, a buffer layer (selectable), and a top tungsten electrode. For example, the Ovonic threshold switch selection element type selector element 121 may be designed by a scheme of depositing a $Si_{15}Ge_7As_{32}Te_{46}$ OTS film having a predetermined thickness (a thickness of 20 nm) by using an RF-magnetron sputtering system on a patterned tungsten electrode (d=30 to 200 nm), and then heat-treating the OTS film at an $N_2$ atmosphere by using a microwave power (e.g., 1000 W), and sequentially depositing a carbon buffer layer and the top tungsten electrode on the $Si_{15}Ge_7As_{32}Te_{46}$ film, but is not limited only thereto.

FIG. 6 is a diagram illustrating a comparison of open forms of a learning error of a neural network in which overfitting occurs and a test error. Specifically, FIG. 6 is a graph illustrating a comparison of an error rate of a train data set and a test data set according to a change in number of epochs.

Referring to FIG. 6, an error rate for train data continuously decreases and converse on 0 after an overfitting point, but the error rate for the test data tends to increase still, and this reflect a result of assuming that the artificial neural network is fitted too close to the train data and the train data is thus completely the same as the test data corresponding to actual data. Therefore, the artificial neural network may operate as a model that may perfectly describe respective individual data which belong to the train data set, but when data which belong to the test data set are applied, if the data is slightly different from the train data, an error in which an inference result becomes different is caused (e.g., the corresponding data is classified into different data). Such overfitting becomes further severe as training is repeatedly conducted, and the error rate continuously increases after the overfitting point.

In other words, referring to FIG. 6, it may be identified that as training the artificial neural network is conducted (i.e., as the epoch increases), the error rate continuously decreases and converges on 0 for the training data set, but the overfitting occurs in the test data set and the error rate thus increases.

Figures 7A, 7B, 7C:
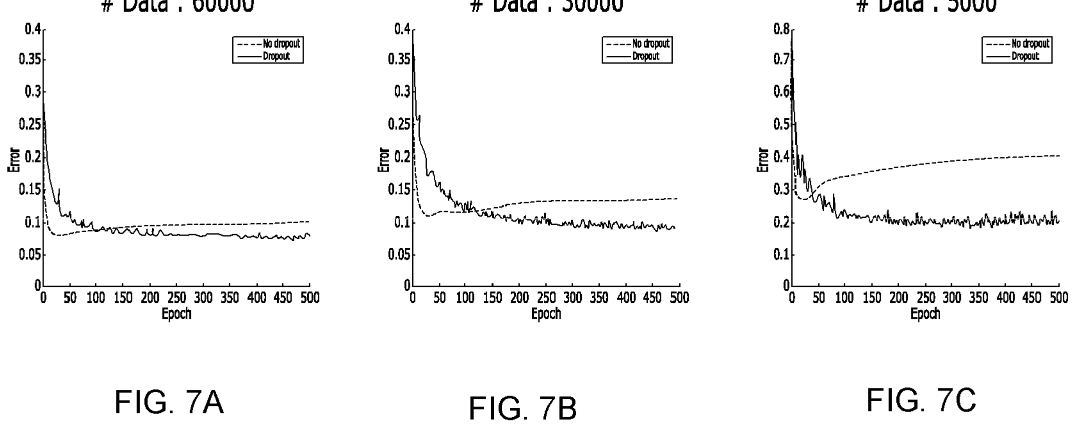
FIGS. 7A to 7C are graphs illustrating a relative comparison of an overfitting occurrence degree according to a change in number of training data.

FIGS. 7A to 7C are graphs illustrating a relative comparison of an overfitting occurrence degree according to a change in number of training data. Specifically, FIGS. 7A to 7C are graphs illustrating a comparison in the error rate for the test data set after changing the number of train data and training between a neural network (blue) to which a dropout is applied and a neural network (orange) to which the dropout is not applied.

Referring to FIGS. 7A to 7C, it may be identified that cases using smaller numbers of train data are illustrated from FIG. 7A to FIG. 7C, and when the dropout technique is not applied (blue graph), a pattern is shown in which the error rate rapidly increases as training is repeated as the number of train data is smaller, and the overfitting excessively occurs as compared with the case of applying the dropout technique (orange graph).

That is, referring to FIG. 7A to FIG. 7C, it may be identified that in the neural network to which the dropout is not applied, the overfitting occurs, and as the epoch increases, the error rate increases, while in the neural network to which the dropout is applied, the overfitting does not occur, so even though the epoch increases, the error rate does not increase.

FIGS. 8A and 8B are diagrams illustrating a comparison of a difference in performance between the neural network to which the dropout is applied and the neural network to which the dropout is not applied.

Specifically, FIG. 8A illustrates visualization of a part of a data set (MNIST data set) used in a test example associated with a technique for implementing a hardware-based dropout for an artificial neural network using a selector element according to an exemplary embodiment of the present disclosure, and a neural network used for evaluating a recognition rate in this test may be provided in a structure including three fully-connected layers, for example.

Further, in this test, an image having an image size of 28×28, and one image channel, and 60,000 images are used as the train data and 10,000 images are used as the test data, and as classified classes, 10 classes, i.e., Class 0 to Class 9 are used (Image size: 28×28/image channel: 1/Train data: 60,000/Test data: 10,000/number of classes: 10 (0 to 9)/Network: 3 layer (784-256-128-10)).

Further, FIG. 8B is a graph illustrating a result of conducting the recognition rate evaluation with 10,000 test data sets after training each of a model to which the dropout is applied and a model to which the dropout is not applied while varying the size of the MNIST training data set to 5,000, 30,000, and 60,000, and referring to FIG. 8B, it may be identified that the recognition rate is higher when the dropout technique disclosed in the present disclosure is applied, and as a result, when the dropout technique disclosed in the present disclosure is applied, the performance of the dropout is further magnified in a situation in which the number of training data is relatively insufficient. This may reflect a case where when data is smaller than the size of the neural network, the overfitting occurs more significantly, and when the dropout technique is applied, the overfitting may be prevented, so a larger effect of the dropout is shown in a situation in which an overfitting phenomenon may be shown significantly (e.g., a situation in which data is less).

Hereinafter, referring to FIGS. 9A to 16, a technique for increasing the reliability of the implementation of the dropout by considering a shift (decrease) phenomenon of the threshold voltage according to a drift effect of the selector element 121 will be described.

Specifically, since the selector element 121, in particular, the OTS uses a Chalcogenide based material in a switching layer, a phenomenon in which the threshold voltage shifts (decreases) by the drift effect in a switching situation in an AC environment occurs.

When the pulse is continuously applied to the OTS (it is assumed that the magnitudes of all pulses are equal to or more than the threshold voltage which is enough to turn on the OTS type selector element 121), if an interval from a subsequent pulse is short after first switching occurs (e.g., if an inter-pulse interval is equal to or less than $10^1$ s when the pulse is continuously applied), the phenomenon in which the threshold voltage decreases in the subsequent pulse occurs, and it may be appreciated that such a phenomenon occurs because heat generated in a very small volume during first switching causes the decrease of the threshold voltage. As a result, if the interval from the subsequent pulse is sufficiently long after the first switching (e.g., if the inter-pulse interval is more than $10^1$ s), the heat is dissipated and the decrease of the threshold voltage is not thus observed.

That is, when a random turn-on/off operation of the selector element 121 is used by continuously applying a single square pulse as illustrated in FIGS. 4C(a) and 4C(b) described above, if a single square-pulse interval is too small (narrow), a threshold voltage shift phenomenon of drift of the selector element 121 may occur.

By considering this, an inventor of the present disclosure applies a double square pulse as described below in detail with reference to FIGS. 12 to 14 so as to resolve a problem depending on the threshold voltage shift phenomenon in the single square pulse, and enable more reliable dropout implementation.

FIGS. 9A to 9C are graphs illustrating a variation between a current response and a cycle for probability characteristics of the selector element in a case of turning on the selector element and a case of turning off the selector element when a square pulse input of the same magnitude is applied to the selector element.

FIGS. 9A and 9B are graphs illustrating a comparison of current responses in the cases of turning on and off the selector element 121 when the square pulse of the same magnitude is input into the selector element 121 as illustrated in FIGS. 4C(a) and 4C(b) described above.

Further, FIG. 9C is a Cycle to Cycle variation graph for probability characteristics of an OTS element, and the single square pulse is used, and an X axis indicates a voltage magnitude, which is increased by every 0.05 V from 1.75 V to 2.05 V. A Y axis indicates a turn-on ratio among 500 times by a probability when 500 square pulses are continuously applied, and irradiating a probabilistic switching operation at 500 times for each voltage from 1.75 V to 2.05 V corresponds to one cycle. FIG. 9C is a graph in which the corresponding cycle is repeated at 10 times, and referring to FIG. 9C, when the single square pulse is used, the probability characteristics are shown, but a probabilistic graph shows a different distribution every time, so it may be difficult to obtain a specific probability at a specific voltage, and since the turn-on probability is too rapidly changed according to the voltage magnitude of the single square pulse (ΔProbability)/ΔV), there may be a problem in that stable and precise probability adjustment is difficult.

Figure 10:
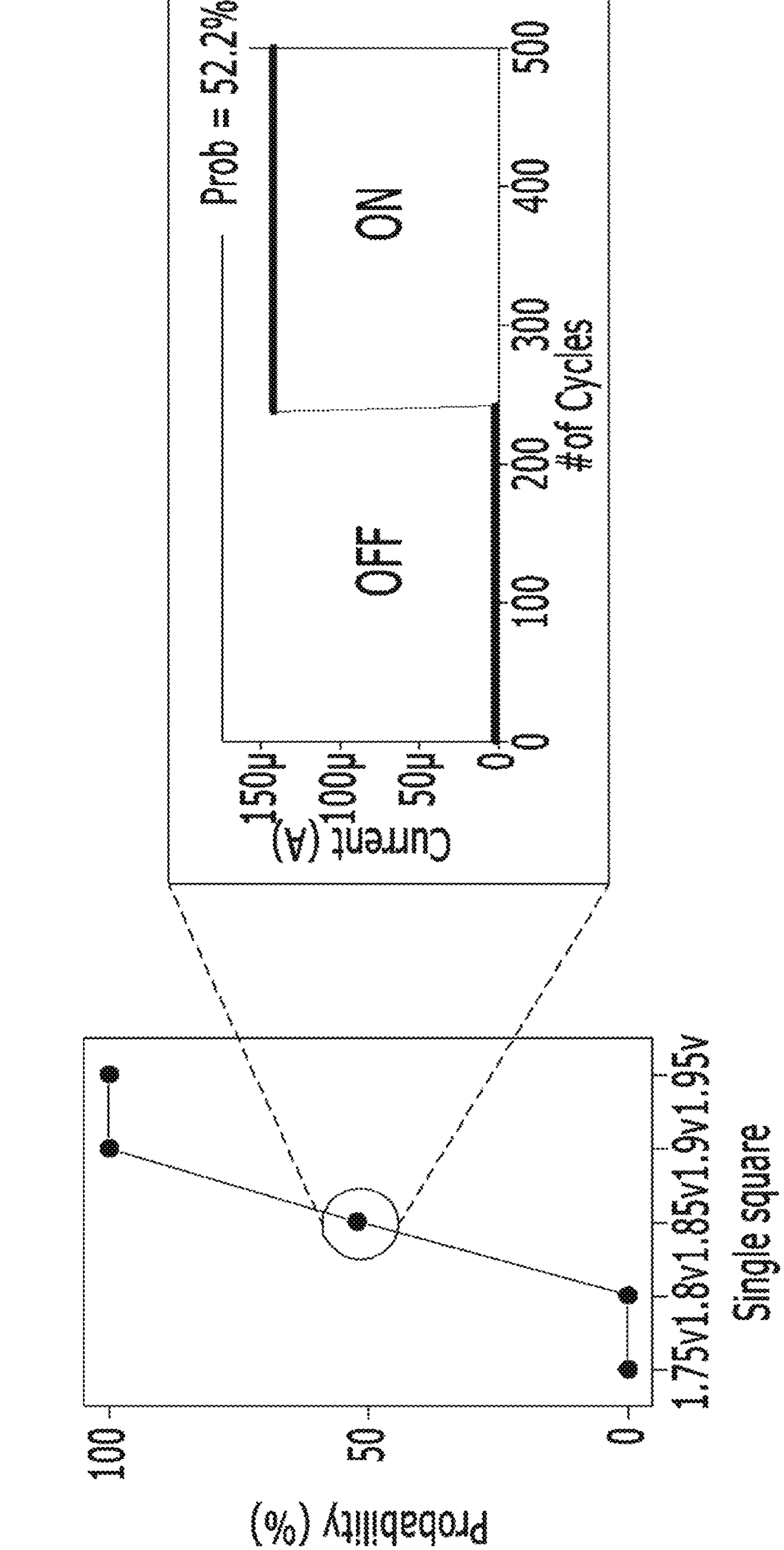
FIG. 10 is a graph illustrating the turn-on ratio, and turn-on and off operations for individual pulses when the single square pulse is applied at multiple times.

FIG. 10 is a graph illustrating the turn-on ratio, and turn-on and off operations for individual pulses when the single square pulse is applied at multiple times.

A probability graph illustrated at a left side of FIG. 10 selectively illustrates a probability graph for a $10^{th}$ cycle c10 in FIGS. 9A to 9C, and referring to the probability graph of the corresponding cycle, it may be identified that the selector element 121 is turned on at 261 times among 500 times (52.2%) at 1.85 V, but referring to a right graph, it may be identified that the selector element 121 is randomly turned on or off and a probability of 52.2% is not obtained, but the selector element 121 is turned off at first 239 pulses and the selector element 121 is turned on at all subsequent 261 pulses, and this may be appreciated as showing operation characteristics not suitable for a dropout requiring a probabilistic operation and a random operation.

FIG. 11 is a diagram illustrating enlargement of the current response for the pulse at an interval in which a turn-off state of the selector element is changed to a turn-on state. Specifically, FIG. 11 illustrates enlargement of a current response from a $238^{th}$ pulse to a $242^{nd}$ pulse in which the turn-off state of the selector element 121 is changed to the turn-on state in FIG. 10.

Referring to FIG. 11, when a continuous single square pulse in which an interval between pulses is very small as 1 μs is input, if a pulse in which the selector element 121 is initially turned on is generated, the threshold voltage of the selector element 121 is decreased by the drift effect with respect to the subsequently applied pulse, a phenomenon in which the selector element 121 is turned on once, and then continuously turned on may occur.

In this regard, FIG. 12 is a conceptual diagram for describing the drift phenomenon. Specifically, FIG. 12 is a graph illustrating a threshold voltage shift effect by drift of the OTS element which is based on Chalcogenide.

Referring to FIG. 12, the threshold voltage shift effect by the drift is generated if the interval from the subsequent pulse is short after the first switching when the continuous pulse is applied, and when the triangular pulse illustrated in FIG. 4B described above is applied after a predetermined time $t_{interval}$ elapsed after the square pulse having a sufficient magnitude to turn on the selector element 121 is primarily applied as illustrated at a right top, the threshold voltage of the selector element 121 by the drift effect after the predetermined time $t_{interval}$ elapsed after the selector element 121 is switched may be determined.

Specifically, a length of the time interval $t_{interval}$ of applying the square pulse and the triangular pulse is changed, and the threshold voltage by the drift effect of the selector element 121 is expressed by an Error Bar (a point represented at a center indicates a mean value of the threshold voltage $V_{th}$ at each $t_{interval}$, and a line represented at an upper side and a lower side of a location represented by the point indicates a standard deviation) and a histogram (distinguished by a graph of a thick and dark line as $t_{interval}$ is shorter).

Referring to FIG. 12, it may be identified that when $t_{interval}$ becomes shorter, the threshold voltage of the OTS decreases, and this may mean that the heat is generated in an OTS volume of a very small region during the first switching, which causes the decrease of the threshold voltage.

That is, when the result of FIG. 11 is described above by the threshold voltage shift phenomenon by the drift effect through FIG. 12, it may be identified that all pulses after the selector element 121 is initially turned on are turned on in a $240^{th}$ pulse in FIG. 11, and when the drift effect is applied, since the selector element 121 is not turned on before the $240^{th}$ pulse in which the selector element 121 is initially turned on, there is a state in which there is no drift effect (drift free), while since a $241^{st}$ pulse is a pulse applied after a very short time 1 μs after the selector element 121 is turned on in the previous pulse (i.e., the $240^{th}$ pulse), the threshold voltage is rapidly decreased by the drift effect. Further, since an interval between all subsequent pulses is 1 μs, the threshold voltage is decreased as compared with the $240^{th}$ pulse which is the pulse in which the selector element 121 is initially turned on, so all subsequent pulses are turned on. Due to such a reason, with respect to the single square pulse, when the selector element 121 is initially turned on in the continuous pulse, all subsequent pulses are turned on and the random operation may not thus be obtained, and since it is not known when the initial pulse is also to be turned on, it may be difficult to obtain a stable probability response when adjusting the applied voltage.

In summary, in the OTS type selector element 121, when the interval between the pulses becomes shorter to a predetermined threshold level or more, the threshold voltage shift phenomenon by the drift effect occurs, and as a result, the drift effect should be able to be particularly adjusted in order to obtain stable probability characteristics and fine quality randomness of the dropout implementation apparatus 100.

In this regard, FIGS. 13A to 13C are graphs illustrating a variation between a current response and a cycle for probability characteristics of the selector element in a case of turning on the selector element and a case of turning off the selector element when a double square pulse input is applied to the selector element.

Specifically, FIGS. 13A and 13B illustrate a double square pulse applied to the selector element 121 for reliable dropout implementation (i.e., implementation of stable probability change and fine quality randomness according to the magnitude of the applied voltage). Referring to FIGS. 13A and 13B, in describing the exemplary embodiment of the present disclosure, the double square pulse may mean a pulse form including two square pulses sequentially applied at a predetermined pulse interval (τ, for example, 1 μs), and a first pulse of the double square pulses is a pulse applied to turn on the selector element 121 by applying a voltage (e.g., 3 V) larger than the threshold voltage of the selector element 121, and a second pulse is a pulse applied to achieve an operation of turning and turning off the selector element 121 probabilistically by applying a voltage in the vicinity of the threshold voltage of the selector element 121 after a fixed pulse interval τ. In other words, the second pulse of the double square pulses is a pulse used for implementing (operating) the dropout.

That is, according to an exemplary embodiment of the present disclosure, by fixing the interval between the pulses by primarily turning on the selector element 121 by using the first pulse of the double square pulses, and then applying a pulse for a second dropout after the predetermined pulse interval τ to fix the interval between the pulses, so the second pulse allows all pulses to have the same time interval to prevent a rapid threshold voltage decrease by the drift effect.

FIG. 13C is a graph illustrating a cycle to cycle variation for the probability characteristics using the double square pulse of the selector element 121. The X axis is the voltage magnitude, which is increased by every 0.05 V from 1.6 V to 1.95 V, and the Y axis represents the turn-on ratio among 500 times as the probability when 500 double square pulses are continuously applied. Further, irradiating the probabilistic switching operation at 500 times for each voltage from 1.65 V to 1.95 V corresponds to one cycle, and FIG. 13C is a graph for a total of 7 cycles. Referring to FIG. 13C and FIGS. 9A to 9C described above jointly, it may be identified that unlike the single square pulse used in FIGS. 9A to 9C, when the double square pulse is used, the probability change for the applied voltage is obtained stably rather than rapidly.

FIG. 14 is a graph illustrating the turn-on ratio, and turn-on and off operations for individual pulses when the double square pulse is applied at multiple times.

The probability graph illustrated in FIG. 14 illustrates operation characteristics in the seventh cycle illustrated in FIG. 13C, and referring to the probability graph illustrated at the right side of FIG. 14, it may be identified that the selector element is turned on at 252 times among 500 times (a ratio of approximately 50.4%) at 1.8 V, and it may be identified that unlike FIG. 10 using the single square pulse, when the double square pulse is used, the fine quality randomness may be secured.

Figures 15A, 15B:
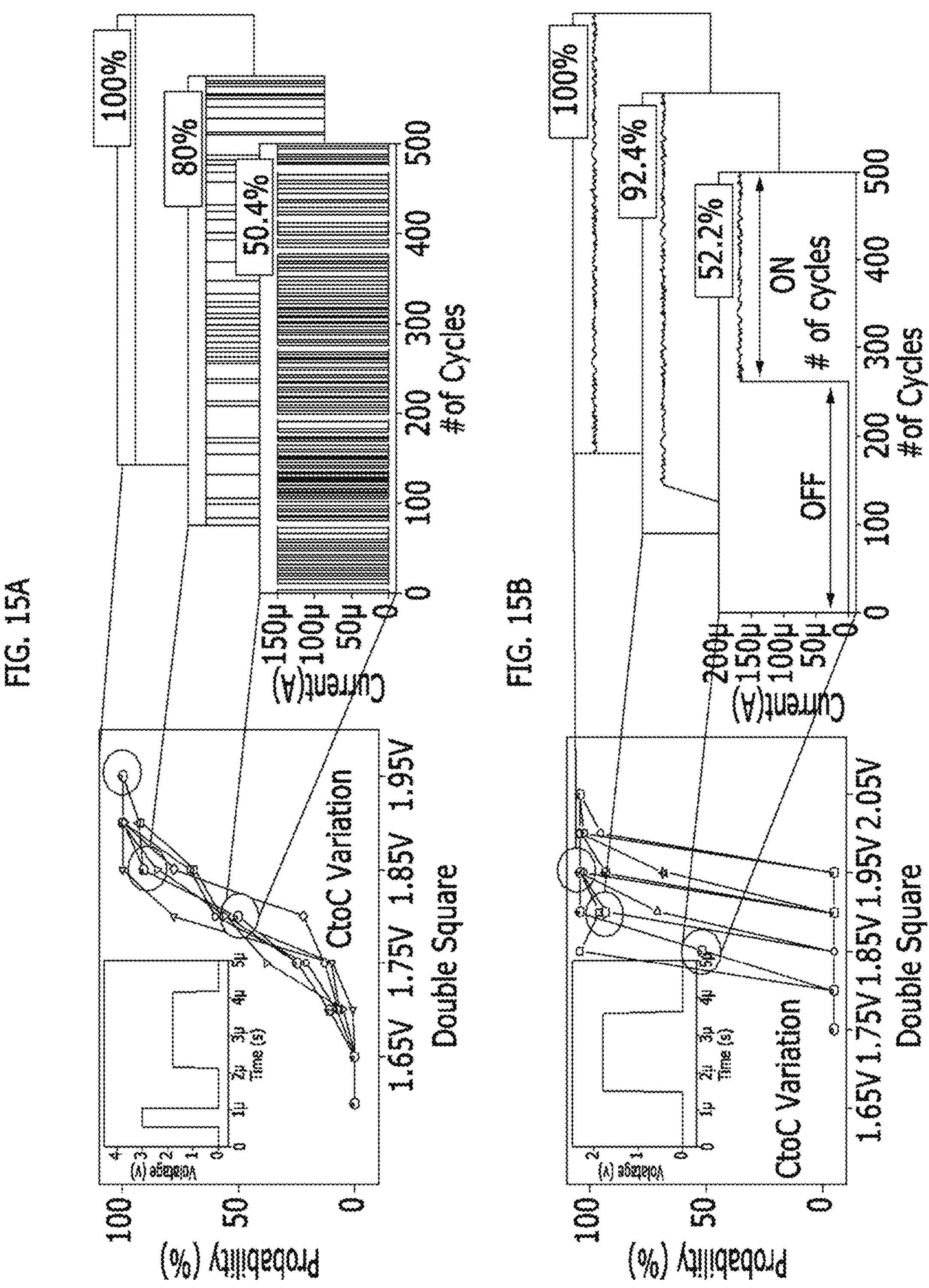
FIGS. 15A and 15B are diagrams illustrating a comparison between a probability response when applying the single square pulse and a probability response when applying the double square pulse.

Specifically, FIGS. 15A and 15B are diagrams illustrating a comparison between a probability response when applying the single square pulse and a probability response when applying the double square pulse.

Referring to FIGS. 15A and 15B, it may be identified that when the double square pulse ('double square' of FIGS. 15A and 15B) is used, the stable probability response may be obtained for the applied voltage and the fine quality randomness may be secured unlike a case of using the single square pulse ('single square' of FIGS. 15A and 15B).

FIG. 16 is a graph illustrating a comparison of current responses of the single square pulse and the double square pulse. Specifically, a first row of FIG. 16 indicates the single square pulse continuously applied, a second row of FIG. 16 indicates a current response $I_{OUT}$ by the single square pulse, a third row of FIG. 16 indicates the double square pulse continuously applied, and a fourth row of FIG. 16 indicates a current response $I_{OUT}$ by the double square pulse.

Referring to FIG. 16, it may be identified that when the single square pulse is used, if the selector element 121 is initially turned on due to the threshold voltage shift phenomenon by the drift effect, the selector element 121 is continuously turned on in subsequent pulses, while when the double square pulse is used, the interval between the pulses is maintained equally, so the selector element 121 is enabled to be randomly operated.

The aforementioned description of the present disclosure is used for exemplification, and it can be understood by those skilled in the art that the present disclosure can be easily modified in other detailed forms without changing the technical spirit or requisite features of the present disclosure. Therefore, it should be appreciated that the aforementioned embodiments are illustrative in all aspects and are not restricted. For example, respective constituent elements described as single types can be distributed and implemented, and similarly, constituent elements described to be distributed can also be implemented in a coupled form.

The scope of the present disclosure is represented by claims to be described below rather than the detailed description, and it is to be interpreted that the meaning and scope of the claims and all the changes or modified forms derived from the equivalents thereof come within the scope of the present disclosure.

What is claimed is:

1. An apparatus for implementing a hardware-based dropout for an artificial neural network using a selector element, the apparatus comprising:

a switch unit disposed on a bit line of a hardware-based artificial neural network, and provided to allow a target current which flows to the bit line to selectively flow to a predetermined neuron or ground node constituting the artificial neural network; and a driving unit which includes the selector element turned on or off according to a size relationship of an applied driving voltage and a threshold voltage, and controlling the switch unit.

2. The apparatus according to claim 1, wherein the threshold voltage associated with the selector element is varied.

3. The apparatus according to claim 2, wherein the selector element is turned on or off at a predetermined probability to allow the target current to be selectively applied to the predetermined neuron or the ground node in response to the predetermined probability every application of the driving voltage.

4. The apparatus according to claim 2, wherein the switch unit includes a first transistor in which a first gate terminal is connected to an output node of the selector element, any one of a first drain terminal and a first source terminal is connected to a node to which the target current is applied, and the other one of the drain terminal and the source terminal is connected to the ground node, and a second transistor in which a second gate terminal is connected to the output node, any one of a second drain terminal and a second source terminal is connected to the node to which the target current is applied, and the other one of the second drain terminal and the second source terminal is connected to the predetermined neuron.

5. The apparatus according to claim 4, wherein the first transistor is an NMOS transistor, and the second transistor is a PMOS transistor.

6. The apparatus according to claim 4, wherein the driving voltage is applied to an input node of the selector element, and the driving unit further includes a resistance element disposed between the selector element and the ground node, and connected to the selector element in series.

7. The apparatus according to claim 6, wherein when the driving voltage is smaller than the threshold voltage, the selector element is turned off to prevent current from flowing to the resistance element, and when the driving voltage is larger than the threshold voltage, the selector element is turned on to apply a voltage larger than a threshold voltage of the first transistor to the resistance element.

8. The apparatus according to claim 1, wherein the driving unit determines a magnitude of the driving voltage applied to the selector element based on statistical data associated with a variation pattern of the threshold voltage, and a predetermined dropout ratio.

9. The apparatus according to claim 1, wherein the apparatus is disposed to correspond to each of a plurality of columns with respect to a crossbar array having a structure including a plurality of rows and the plurality of columns to correspond to a plurality of neurons constituting the artificial neural network.

10. The apparatus according to claim 1, wherein the selector element is an Ovonic threshold switch selection element.

11. The apparatus according to claim 10, wherein the Ovonic threshold switch selection element is provided in a hierarchical structure including a bottom tungsten electrode, an OTS film, a buffer layer, and a top tungsten electrode.

12. The apparatus according to claim 1, wherein the target current corresponds to a computation result of a previous neuron computed preceding the predetermined neuron among a plurality of neurons constituting the artificial neural network.

13. The apparatus according to claim 12, wherein when the switch unit is controlled to allow the target current to flow to the ground node in a specific epoch when learning the artificial neural network, the predetermined neuron is not involved in learning the artificial neural network in the corresponding epoch.

14. A neural network circuit system using an apparatus for implementing a hardware-based dropout for an artificial neural network using a selector element, comprising:

a crossbar array having a structure including a plurality of rows and a plurality of columns to correspond to a plurality of neurons constituting the artificial neural network; and a plurality of apparatuses for implementing the hardware-based dropout for the artificial neural network using the selector element according to claim 1, which is disposed to correspond to the plurality of columns, respectively.

* * * * *